United States Patent [19]

Bone et al.

[11] Patent Number: 5,076,480

[45] Date of Patent: Dec. 31, 1991

[54] VARIABLE PITCH FEED OF FASTENERS

[75] Inventors: Arnold R. Bone; John J. Murphy, both of Needham, Mass.

[73] Assignee: Dennison Manufacturing Company, Framingham, Mass.

[21] Appl. No.: 588,753

[22] Filed: Sep. 27, 1990

[51] Int. Cl.[5] .......................... B23D 17/00; B65C 5/06

[52] U.S. Cl. ........................................... 227/67

[58] Field of Search ........................................ 227/67

[56] References Cited

U.S. PATENT DOCUMENTS

| | | | |
|---|---|---|---|
| 4,310,902 | 1/1982 | Suzuki | 227/67 X |
| 4,456,462 | 6/1984 | Furutso | 227/67 |
| 4,461,417 | 6/1984 | Furutsu | 227/67 |
| 4,465,218 | 8/1984 | Furujsu | 227/67 |
| 4,482,087 | 11/1984 | Furutsu | 227/67 |
| 4,538,754 | 9/1985 | Furutsu | 227/67 |
| 4,651,913 | 3/1987 | Bone | 227/67 |

*Primary Examiner*—Paul A. Bell

*Attorney, Agent, or Firm*—Arthur B. Moore

[57] ABSTRACT

Variable pitch feed of fasteners by a unitary, single toothed feed pawl. In a first embodiment, back-up of the fasteners is prevented using a downwardly pointed detent tooth which bits into a secondary runner bar of the fastener assemblage, preferably at a point somewhat beyond the fastener ejection axis. In a second embodiment, the secondary runner bar includes a series of lands spaced at the same pitch as the fasteners, and the detent comprises a pin biased toward the runner bar to intermittently engage the lands. Back-up of the fastener assemblage is prevented by the detent, and individual fasteners are securely positioned for ejection.

3 Claims, 7 Drawing Sheets

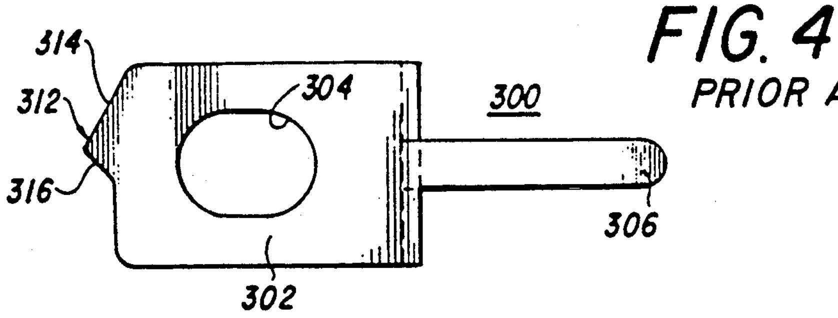
FIG. 4a
PRIOR ART
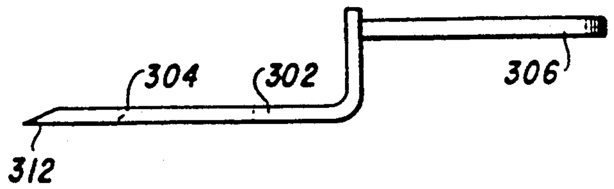
FIG. 4b
PRIOR ART
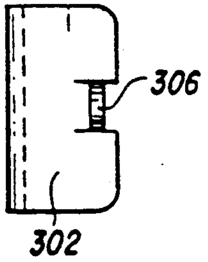
FIG. 4c
PRIOR ART
FIG. 5a
PRIOR ART
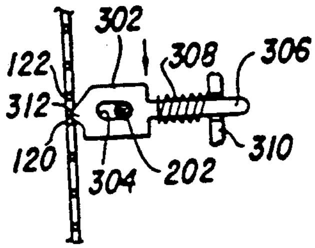
FIG. 5b
PRIOR ART
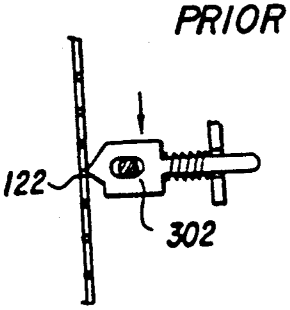
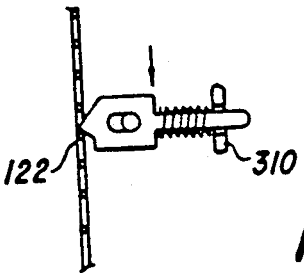
FIG. 5c
PRIOR ART

VARIABLE PITCH FEED OF FASTENERS

This invention relates to the feed of fasteners, and more particularly to the variable pitch feed of fasteners.

A common fastener for tagging or attaching items is of the kind shown and described, for example, in U.S. Pat. No. 3,380,122. The fasteners are in an assemblage including a connecting bar, a plurality of coplanar connecting stubs extending from the connecting bar, a cross bar angularly disposed on each stub, a filament extending from each cross bar, and typically, a head attached to each filament. Common fastener attaching apparatus, such as is shown and described for example in U.S. Pat. No. 4,416,407 are designed to install fasteners disposed at a unique distance, relative to each other, on the connecting bar. Typically, a feed wheel is provided having circumferential teeth which mate with the assemblage stubs, operable to advance the assemblage in the apparatus. The number and pitch of the feed wheel teeth correspond to the pitch, or relative separation, of fasteners on the assemblage. However, fasteners are provided in varieties for which it is common practice to have a different fastener dispensing apparatus for each variation.

Accordingly various attempts have been made to provide for feeding, in a single apparatus, of different assemblages, each having a unique pitch. Japanese publication No. 48939 dated May 2, 1981 shows a fastener installation apparatus including a feed member having cooperative feeding and anti-back-up members. In one embodiment, an advance mechanism includes a U-shaped rod, the rod ends engagable with an installed fastener assemblage. In an alternative embodiment, two rods engage the assemblage. In each embodiment, an upper rod acts to advance the assemblage, and a lower rod serves to prevent upward movement of the assemblage during feeding. Both rods may bend in either direction, however, each rod end is provided with an angled upper surface so that downwards movement of the assemblage is favored. The feeding strength of this apparatus is limited by the resiliency, or biasing strength, of the upper rod. As the strength of the upper rod is increased, so too must the strength of the lower rod be increased, otherwise, the assemblage will back-up as the upper rod is urged upwardly. As a result, advancing strength is dissipated by the lower rod. Thus only a small advancing force can be generated by this design. Therefore this apparatus is vulnerable to misfeeding and jamming, particularly where the assemblage fails to slide smoothly within the guide grooves of the apparatus.

U.S. Pat. No. 4,461,417 shows an apparatus designed to install fastener assemblages of varying pitch. A claw is pivotally mounted to a vertically movable cam plate, the claw being biased in the direction of the connecting bar. A stationary claw with downwardly angled teeth is provided for the purpose of preventing upward movement of the connecting bar during feeding, and is located on the side of the connecting bar opposite the movable claw. In operation, the cam plate is raised, causing the movable claw to be dragged upwardly along the connecting bar. When the trigger is released the cam plate is lowered, wherein the movable claw, or in an alternative embodiment, the teeth, engages the connecting bar and urges the assemblage downwardly. Since the claw is not drawn away from the connecting bar, an upwards force is exerted upon the connecting bar. A disadvantage to this design resides in the pivotal arrangement of the claw. As the cam plate is raised, the claw is pressed with continually greater force against the connecting bar, raising the potential for a jam. As the cam plate is lowered, the claw does not contact the connecting bar until the claw has pivoted into position, thus the connecting bar may not be advanced sufficiently to position the next fastener for ejection. Additionally, the design depends on the claw or teeth cutting into the connecting bar in order to advance the fastener assemblage. Since fastener assemblages are fabricated from a wide variety of materials, there exists the possibility that the claw will either imbed itself too deeply into the connecting bar, causing a jam, or will fail to engage, resulting in a misfeed.

In a third approach, taken in U.S. Pat. No. 4,465,218, a tooth is moveably mounted within a pivotable base. The tooth is biased in the direction of the assemblage, pivoting on a pin. To prevent the tooth from overextending, a pin extends from the base into an aperture located near the tooth. When the trigger is depressed, the base pivots urging the tooth upwards. The tooth is caused to pivot, deflecting around the next stem. When the trigger is released the tooth engages the stem and urges the assemblage downwards. One disadvantage of this design is that all of the advancing and biasing force is exerted upon a small pivot pin which is subject to wear and breakage. Another disadvantage is that the design requires two carefully mated parts which must be assembled, thus raising the cost of the apparatus.

To prevent back-up of the assemblage during feed, the '218 patent provides a tooth biased in the direction of the assemblage, to engage the connecting stubs. The tooth has an upper profile disposed at an angle to the axis of the assemblage, thus permitting downwards movement. A lower profile is disposed perpendicular to the axis of the assemblage, thus preventing upward movement of same. A problem with this design is that the device provides for only a fixed stub thickness. A thicker stub would not fit beneath the lower profile. A thinner stub could move up or down below the lower profile. As a result, the push rod, or plunger, may not squarely engage the cross bar, and thus jamming can arise. Additionally, this design does not permit the fastener assemblage to be withdrawn without additional devices for retracting the anti-back-up member.

Commonly assigned U.S. Pat. No. 4,651,913 discloses another fastener dispensing tool which permits variable pitch feed of fasteners. This tool of the present invention represents an alternative version of the 3 913 fastener installation apparatus. With reference to the prior art views of FIGS. 1, 2A, and 2B, the '913 tool includes a feed member 200, comprising a pivot pin 202, link aperture 204, and finger 206 having tooth 208. Feed member 200 is preferably fabricated from a resilient wear resistant material, such as NYLON or an acetal resin. Pin 202 is received within the frame, or alternatively, the frame is provided with a pin matable with an aperture in feed member 200, so that the feed member has a fixed pivot. Aperture 204 couples to linking rod 19h. Finger 206 has a curved profile, and is integrally formed from the feed member body 210. The apparatus frame is provided with a curved ridge 20 matable with the curved profile of finger 206. Tooth 208 has an upper surface 212 defining an angle with respect to the axis of the installed assemblage, when the feed member is in an advanced position, as shown in FIG. 1. In a preferred embodiment, surface 212 thus defines an angle of 30 –45 degrees, preferably 40 degrees. In this position, the tooth lower surface 214 is approximately perpendicular to the axis of the assemblage. It is noted, however, that a range of angles may be advantageously employed for surfaces 212 and 214, depending on the intended application.

To prevent the fastener assemblage 100 from moving upwards during cycling of feed member 200 or 400, an anti back-up member 300 was provided, as shown in prior art FIGS. 3, 4, and 5. Location member 300 comprises a base 302 having a slot 304, a stem 306 extending from base 302, biasing means 308, a stem guide 310, and a tooth 312.

Location member 300 was positioned beneath feed member 200 or 400, wherein pivot pin 202 passes through slot 304. Stem guide 301 was formed as a groove in the fastener body, subject to and additionally providing support to plunger 15. Biasing means 308, for example a spring was mounted on stem 306, confined between guide 310 and body 302. Thus configured, location member 300 was urged in the direction of the installed fastener assemblage 100. The length of slot 304 determined the maximum range over which location member 302 could move. Tooth 312 was provided with an upper surface 314 defining an angle of low elevation, in a preferred embodiment, in the range of 25 -35 degrees, preferably 30 degrees with respect to the axis of location member 302 movement. Tooth 312 lower surface 316 was provided with a higher angle relative to upper surface 314, in a preferred embodiment in the range of 40 -50 degrees, preferably 45 degrees with respect to the axis of location member 302 movement. The importance of the angular surfaces can be explained with reference to FIG. 5.

In FIG. 5*a*, location member 300 urges stem 120 downwards through a force exerted by lower surface 316. Stem 120 is prevented from moving beyond ejection location due to contact between cross bar 104 and the fastener apparatus frame. Due to the high angle of lower surface 316, a constant pressure is maintained against stem 118, rigidly locking same in ejecting position, thereby markedly reducing the possibility of jamming or misfiring. This aspect is of particular importance, since stem thickness can vary considerably among different fastener assemblages. Even where only one stem thickness is employed, molding variation and flash thickness can introduce variation. This problem is eliminated by location member 300, which exerts a constant force downwardly on the stem, regardless of stem thickness. After the fastener connected to stem 120 has been ejected, feed member 200 advances assemblage 100, thereby causing stem 122 to be pushed downwardly against upper surface 314. Due to the low angle of upper surface 314, location member 300 is easily urged rearwardly, thus permitting the assemblage to be advanced. Concomitantly, as feed member 200 is pivoted in direction A, lower surface 316 prevents upwards movement of assemblage 100, due to the high resistance imposed by the higher angle of surface 316.

The present invention provides alternative designs to the location member or detent illustrated in FIGS. 3-5, discussed above. Instead of providing a member which is designed to act upon the fastener stem 120 and must therefore be located in close proximity to the feed member 200 which also acts upon the stem, the detent of the invention acts upon the connecting bar 121 which supports the stems or stubs 122.

It is therefore a principal object of the invention to provide reliable variable pitch fastener installation apparatus. Such apparatus should securely position fasteners to be ejected, while simultaneously preventing unwanted back-up of the assemblage during feeding.

SUMMARY OF THE INVENTION

In accomplishing the foregoing and related objects, the invention provides improved variable pitch apparatus for dispensing individual fasteners severed from a fastener assemblage having a unitary, single toothed feed pawl rotatably mounted to a tool body for receiving the fasteners; said feed pawl including a pivotally mounted, curved finger; said apparatus further including means for biasing the curved finger, and a support member matable with said curved finger; wherein the improvement comprises a detent member which securely positions the fastener for ejection by engaging a connecting bar of the fastener assemblage, to which individual fasteners are joined. A plastic fastener assemblage installable with the invention includes: a connecting bar; a plurality of coplanar, spaced apart stubs; a cross bar disposed about the end of each stub; a filament extending from each cross bar; and a head portion disposed about the end of each filament.

In the preferred embodiment of the invention, the detent comprises a sharp, downwardly pointed tooth which is biased toward the connecting bar transversely to the longitudinal axis of said connecting bar (i.e. the axis of assemblage feed). The pointed tooth has a medial axis which is angled toward the direction of advance of the fastener assemblage, thereby permitting the advance of the connecting bar while preventing retrograde motion by biting into the assemblage plastic material. Preferably, the detent is located slightly beyond the point along the assemblage feed axis at which individual fasteners severed from the assemblage are dispensed from the apparatus, and is disposed on the same side of the fastener assemblage as the feed pawl.

The detent of the preferred embodiment is designed to install fasteners having cylindrical connecting bars as are typical of the prior art. The cylindrical cross section may be round (i.e. essentially circular) or of a non circular cross section.

An alternative detent, also designed to engage the connecting bar, is designed to operate with fastener assemblages having a connecting bar with a series of molded lands spaced at the same pitch as the fasteners carried by the connecting bar. In this approach the detent comprises a pin which is movable transversely to the connecting bar axis, together with means for biasing the pin toward the connecting bar. The detent pin and molded lands or cavities are configured so that the pin will retract during the advance of the fastener assemblage, but will prevent retrograde motion of the assemblage.

In this alternative embodiment, preferably, a first surface of the molded land which contacts the detent pin is molded with a slope in excess of 45° from a hypothetical surface parallel to the detent pin axis and normal to the axis of the connecting bar. A second detent-pin-engaging surface of the molded land is formed with a much more gradual slope, preferably less than 20° from such hypothetical surface. The first surface facilitates foreward motion during advance of the fastener assembly, which the second surface inhibits backward motion as a fastener is cut off and ejected.

Variations of this alternative embodiment include: assymetrically profiled cavities (rather than lands) molded into the connector bar with the detent pin riding into and out of said cavities; and molded lands which engage a cavitated detent pin.

BRIEF DESCRIPTION OF THE DRAWINGS

The above description of prior art U.S. Pat. No. 4,651,913, together with the following discussion of the preferred embodiment, is illustrated in the drawings in which:

FIGS. 4*a*, 4*b*, and 4*c* are a front, side, and end view of the anti-backup member shown in FIGS. 1 and 3;

FIGS. 5*a*, 5*b*, and 5*c* are a schematic of the steps in locating a fastener assemblage, showing the prior art anti-backup member of FIGS. 1 and 3;

DETAILED DESCRIPTION

Figure 1:
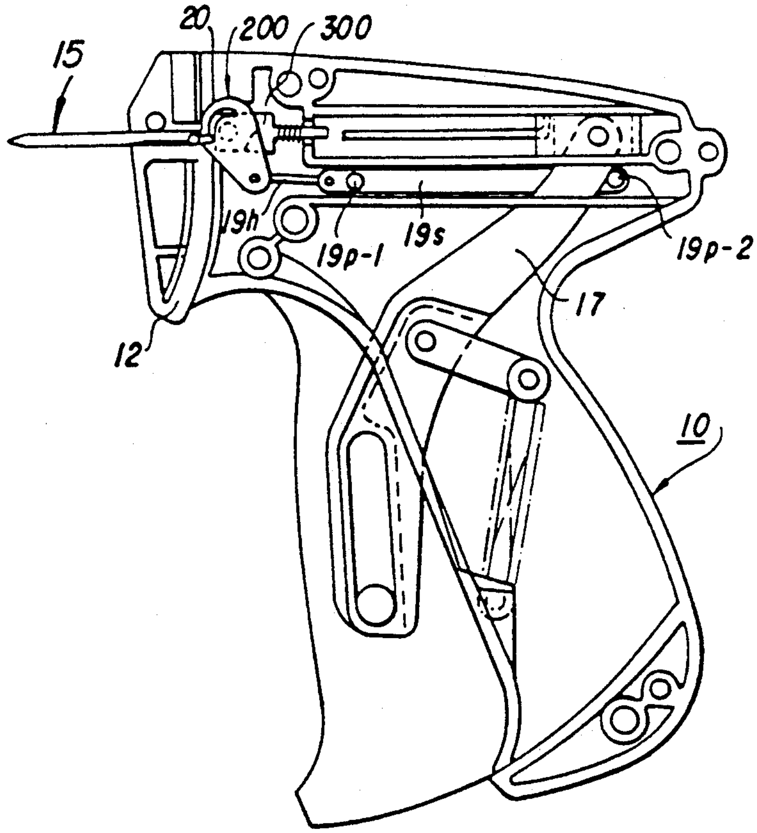
FIG. 1 PRIOR ART
FIG. 1 is a sectional view of a prior art fastener installation apparatus in accordance with commonly assigned U.S. Pat. No. 4,651,913, showing the fastener feed member as well as the anti-back-up member.
Figure 2A:
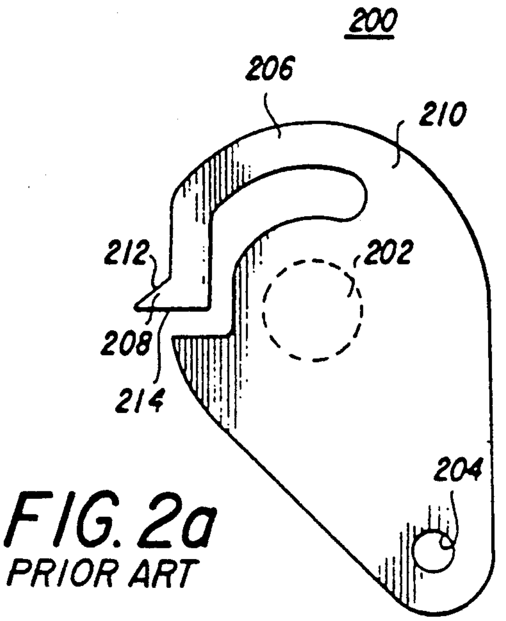
FIG. 2a PRIOR ART
FIGS. 2*a* and 2*b* are a front and side view of the prior art feed member of FIG. 1.
Figure 2B:
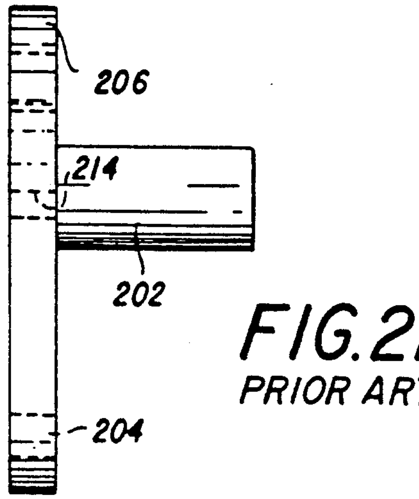
FIG. 2b PRIOR ART
Figure 3:
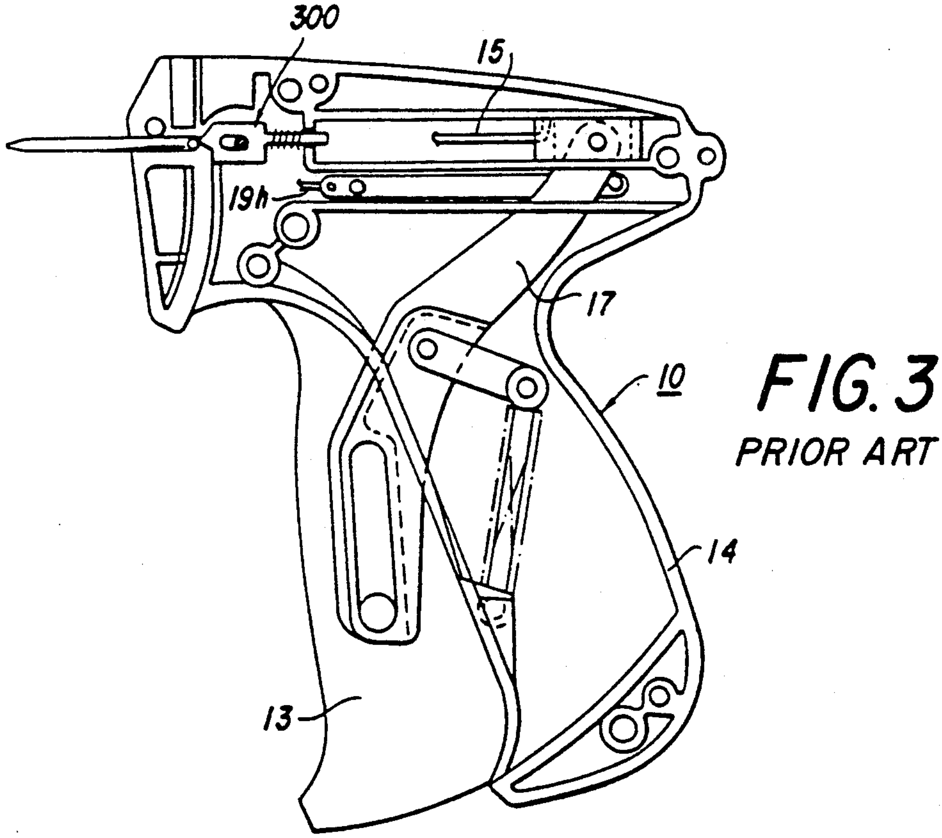
FIG. 3 PRIOR ART
FIG. 3 is a sectional view from the prior art view of FIG. 1, with the feed member removed to more clearly show the anti-backup member.
Figure 7:
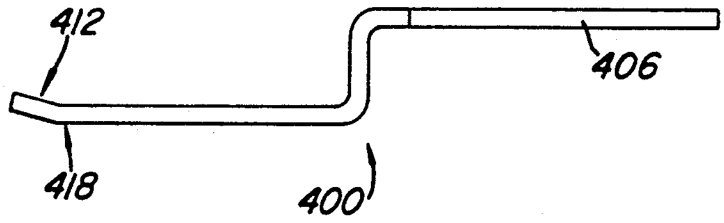
FIG. 7 is a side view of the detent of FIG. 6.
Figure 6:
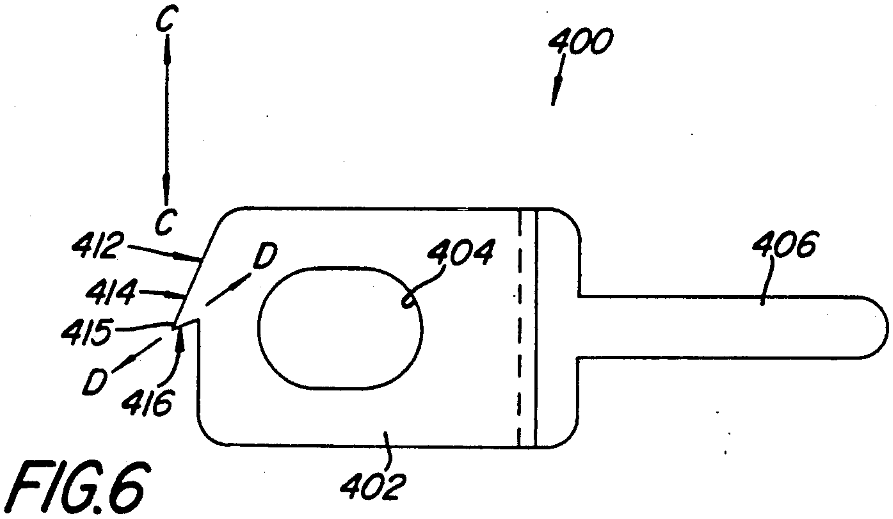
FIG. 6 is a front view of the anti-backup member (or detent) of the preferred embodiment of the invention.
Figure 8:
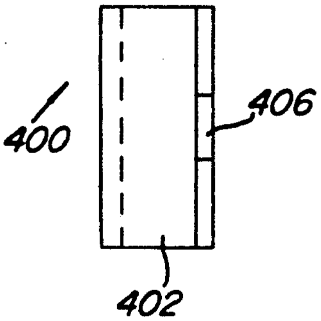
FIG. 8 is an end view of the detent of FIG. 6.

Reference should now be had to FIGS. 6–9*b* which illustrate an anti-back-up member or detent 400 in accordance with a preferred embodiment of the invention. FIGS. 6–8 show the detent 400 in front, side, and end views, corresponding to the respective views 300 in FIGS. 4*a*–4*c*. Detent 400 is positioned beneath the feed pawl 200 just as shown in FIG. 1 for the prior art detent 300. The positioning of pivot pin 200 through slot 404 (FIG. 6), and mounting and biasing of the detent 400, is identical to the arrangement shown in FIGS. 3 and 5 for detent 300. The difference between detents 300 and 400 lies in the contrast between the tooth 312 of detent 300, which is designed to engage the fastener stubs 122, 124, etc. as described above, and the tooth 412 of detent 400.

Figure 9B:
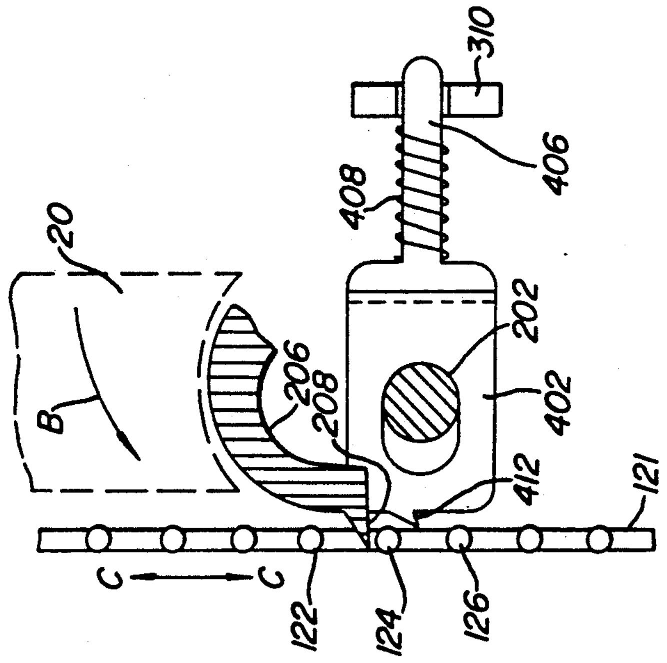
FIG. 9*a* and 9*b* are partial perspective views showing the detent of FIGS. 6–8 engaging a fastener assemblage within a tool of the type shown in FIG. 1, in different steps of locating the fastener assemblage.
Figure 9A:
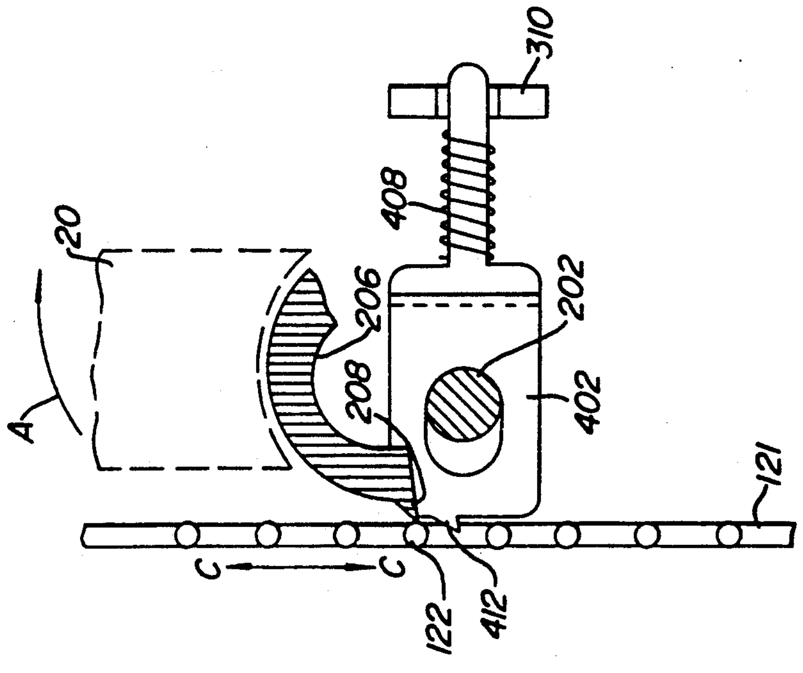

As seen in FIG. 7, tooth 412 is bent at 418 from the plane of detent body 402. Illustratively, tooth 412 is bent at 15 degrees from the plane of body 402. Because of this fact, the tooth 412 engages the connecting bar 121 rather than stubs 122 (FIGS. 9*a*, 9*b*). Referring to FIG. 6, tooth 412 is downwardly pointed; that is, relative to a perpendicular to the assemblage feed axis C—C, it points in the direction of assemblage advance. In an operative embodiment, the upper surface 414 of tooth 412 is oriented at an angle of 30 degrees from the axis C—C, while the lower surface 416 is oriented at 70 degrees from such axis. Thus, the medial axis D—D of tooth 412 is oriented at 50 degrees from the axis C—C. The point 415 of tooth 412 is quite sharp, enabling the tooth to bite into the polymer material of connecting bar 121 as discussed below.

FIGS. 9*a* and 9*b* show the positions of feed finger 206 and detent 400 relative to fastener assemblage 100 at two different points of the feed cycle. After a fastener has been expelled from the needle of tool 10, feed finger 206, rotating in direction A, is caused to withdraw and is bent inwardly as its tooth 208 is pushed back by stem 122.

During this interval, the fastener assemblage 100 is subjected to an upward force by the feed pawl, but retrograde motion is prevented by detent 402 which is biased toward the assemblage 100. The downwardly pointed tooth 412 bites into the connecting bar 121 preventing regression of the fastener assemblage. In FIG. 9*b*, the feed finger 206 is rotating in the direction shown by arrow B, contacts the upper surface of stub 122 and advances the assemblage 100 so that the stub and connected fastener are in-line with the needle for ejection. During this interval, the downwardly pointed tooth 412 slides against the connecting bar 121 and does not significantly retard the motion of assemblage 100.

In the preferred embodiment shown in FIGS. 6–9*b*, detent 400 is located on the same side of the assemblage feed channel as is the feed pawl 200, and the point 412 engages connecting bar 121 somewhat beyond the fastener ejection axis. It is to be noted that detent 400 operates independently of the pitch of fasteners on assemblage 100.

Figure 10:
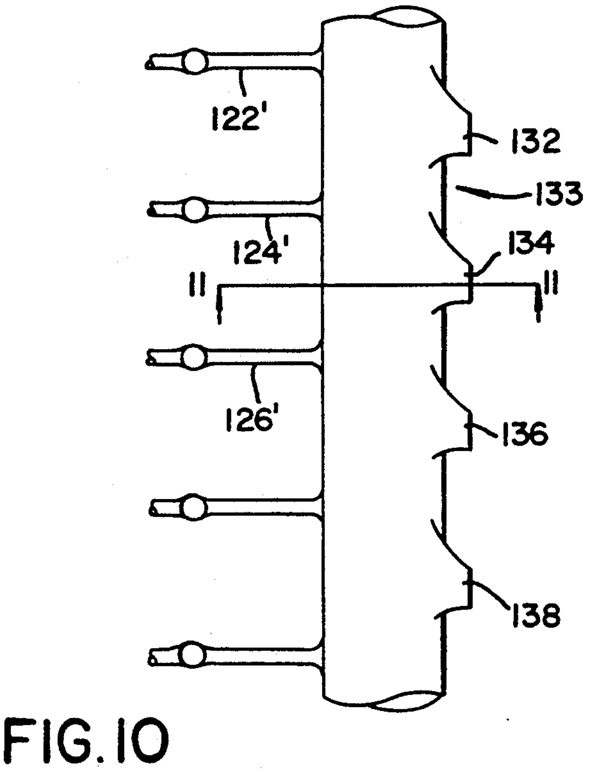
FIG. 10 is a partial perspective view showing a portion of the connecting bar stubs, and cross bars of a modified fastener assemblage for use with an alternative anti-backup device.
Figure 11:
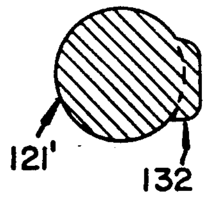
FIG. 11 is a sectional view of the connecting bar from the fastener assemblage of FIG. 10, taken along the section 11—11 through one of the lands.
Figure 12:
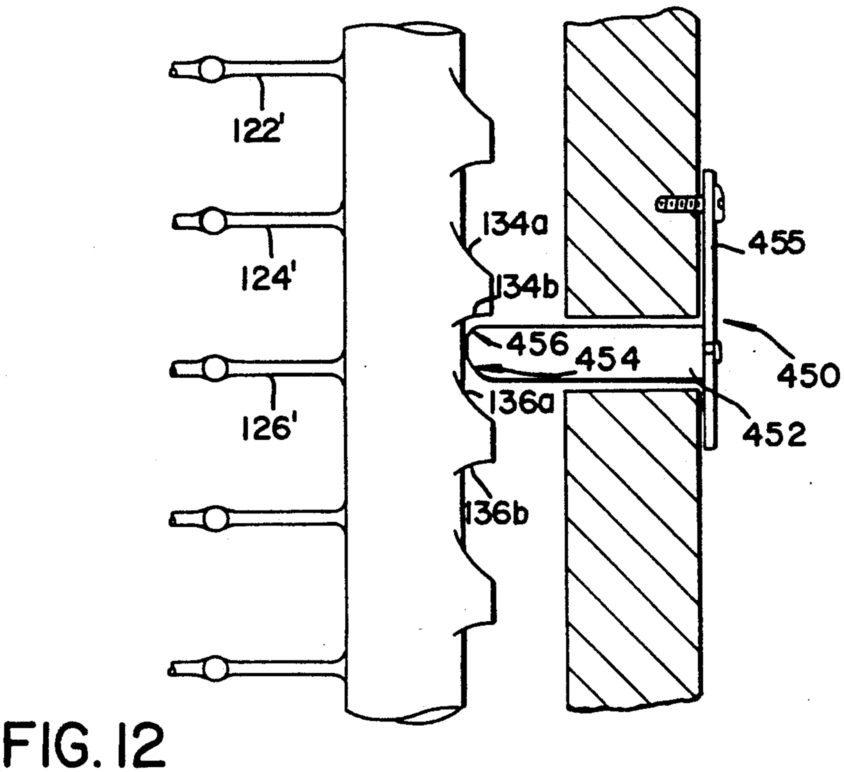
FIG. 12 is a cross sectional view of the fastener assemblage and anti-backup member of the alternative embodiment of the invention.

FIGS. 10–12 illustrate an alternative detent 450 which is also designed to engage the connecting bar 121′. In this embodiment, connecting bar 121′ includes a series of molded lands 132, 134, 136 etc. spaced at regular intervals. Lands 132, 134, 136 are spaced at the pitch of fastener connections to the connecting bar 121′. Each adjacent pair of lands defines between them a notch (133, 135, 137, etc.). Detent 450 consists of a reciprocatively mounted pin 452 which is biased toward the connecting bar 121′ by leaf spring 455. In the illustrated embodiment notches 133, 135, etc. are located opposite respective stubs 122′, 124′, etc.

Referring to FIG. 10, the lands 132, 134, 136, etc. are chamfered along their surfaces defining the notches 133, 135, 137, etc. FIG. 11 shows a section taken through the land 132 at an axial plane of the connecting bar 121′, section 11—11 in FIG. 10. The end of pin 452 is chamfered at 454, 456, the surfaces of engagement with the connecting bar lands.

In this embodiment the surface 134*a* of the land 134 which contacts the detent pin surface 454 is fashioned with a slope in excess of 45° from a surface parallel to the axis of the detent pin and normal to the axis of the runner 138. The surface 134*b* which contacts the detent pin surface 456 is fashioned with a slope less than 20 . The difference in these slopes facilitates forward (upward) motion of the assembly during the feeding of the fastener assemblage, and inhibits backward (downward) motion of the assemblage as the fastener is cut off and ejected through the hollow needle. This action comprises another form of anti-back member. The radius of the pin is the same for surfaces 454 and 456 and if the pin is round the surface may be common and in the form of a chamfer with a slope of approximately 20° from the vertical.

The height of the lands above the runner 138 is not critical. A practical lower limit for this dimension would be 0.030".

Figure 13:
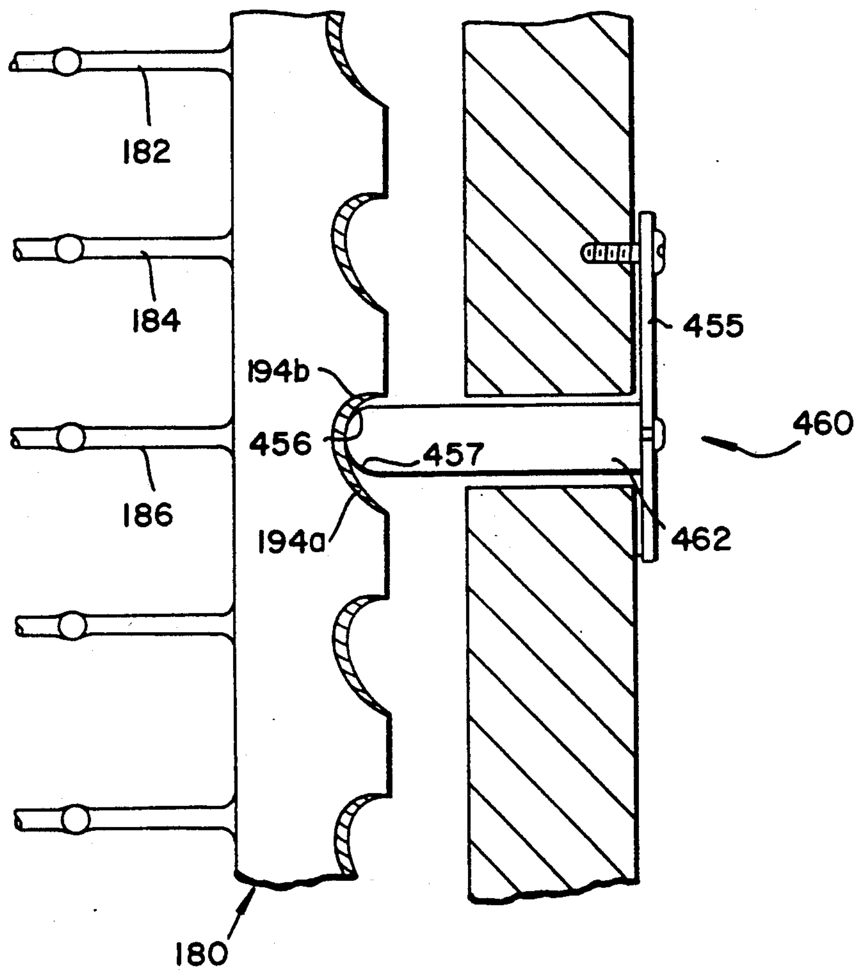
FIG. 13 is a cross-sectional view of a fastener assemblage and anti-backup device in a variation of the embodiment of FIGS. 10–12.

This second embodiment of the invention admits of a number of variations, including cavities molded into the runner in lieu of lands with the detent pin riding in and out of the cavities, which cavities are fashioned with asymmetrical surfaces along the axis of the runner to impede or promote the action of the detent, as described above. FIG. 13 illustrates a fastener assemblage 180 with molded detent cavities 192, 194, etc. having assymmetric slopes of their leading and trailing walls 194*a*, 194*b*. Similarly, the detent can be a spring loaded member with a cavity or depression which contacts lands molded into the surface of the runner. In this case the forward and rearward surfaces of the lands can be molded with different slopes, or the slopes can be impressed into the corresponding surfaces of the cavity. As in the embodiment of FIGS. 10–12, the arrangement shown in FIG. 13 facilitates forward (upward) motion of assemblage 180, and inhibits rearward (downward) motion.

In the illustrated embodiment the spring loaded detent pin 462, and lands 132, 134, 136, are located on the side of the connecting bar opposite the stubs 122, 124, 126, etc. It is quite feasible to locate the lands and detent elsewhere, for example along either side of the connecting bar 90 degrees from the line of connection to the stubs. The detent may be placed at the axis of fastener ejection (i.e. longitudinal axis of needle 15). Typically since such fastener assemblages are molded such that the connecting bar 121 extends somewhat beyond the endmost fastener connections (stubs), the detent 460 may be located somewhat beyond the fastener ejection axis.

The advantage of this approach is that regardless of whether lands or cavities are molded into the runner, the detent position can be arbitrarily positioned with respect to the feed increment of the fastener assembly, thus allowing firm detent action for all fasteners in the assembly regardless of their position.

We claim:

1. Improved apparatus for dispensing of fasteners from a fastener assemblage comprising a plurality of individual fasteners coupled to a connecting bar by respective stems, said connecting bar having a series of molded cavities spaced at the spacing of individual fastener connections to said connecting bar; said apparatus being of the type comprising: a frame for receiving the fastener assemblage; a feed member rotatably mounted on said frame for advancing the fastener assemblage, a finger integrally hinged to said feed member, a tooth disposed about the end of said finger, and means for biasing said finger in the direction of the fastener assemblage;

wherein the improved apparatus further comprises a yieldably mounted detent member having an end configured to fit into said molded cavities, and means for biasing said detent member toward said connecting bar.

2. Improved apparatus for dispensing of fasteners from a fastener assemblage comprising a plurality of individual fasteners coupled to a connecting bar by respective stems, said apparatus being of the type comprising: a frame for receiving the fastener assemblage; a feed member rotatably mounted on said frame for advancing the fastener assemblage; a finger integrally hinged to said feed member; a tooth disposed about the end of said finger; and means for biasing said finger in the direction of the fastener assemblage;

wherein the improvement comprises means for preventing the retrograde motion of the fastener assemblage comprising a yieldably mounted, planar detent member having a sharp tooth which is downwardly pointed and bent from the plane of the planar detent member, and means for biasing said detent member toward the connecting bar, wherein said sharp tooth engages said connecting bar to oppose retrograde motion, but slides against the connecting bar to allow advance of the fastener assemblage.

3. Improved apparatus for dispensing of fasteners from a fastener assemblage comprising a plurality of individual fasteners coupled to a connecting bar by respective stems, said connecting bar having a series of molded lands spaced at the spacing of individual fastener connections to said connecting bar; said apparatus being of the type comprising: a frame for receiving the fastener assemblage, a feed member rotatably mounted on said frame for advancing the fastener assemblage, a finger integrally hinged to said feed member, a tooth disposed about the end of said finger, and means for biasing said finger in the direction of the fastener assemblage;

wherein the improved apparatus further comprises a yieldably mounted member having an end configured to fit into notches defined by adjacent molded lands, and means for biasing said detent member toward said connecting bar.

* * * * *